May 10, 1932.  W. J. COULTAS  1,857,273
CRANK WHEEL SHIELD FOR MOWERS
Filed March 31, 1930
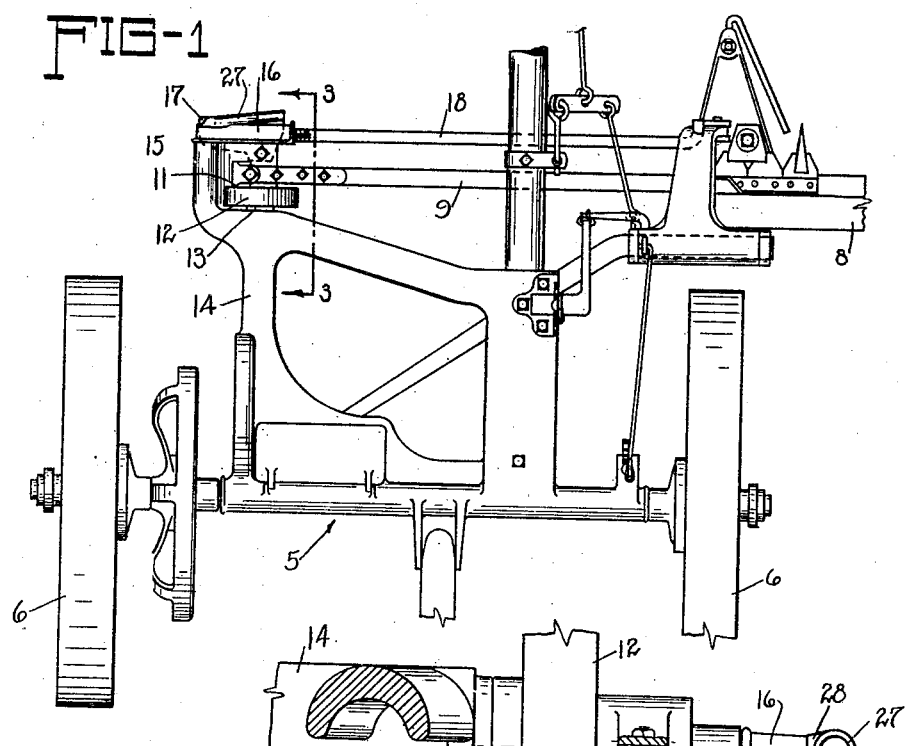
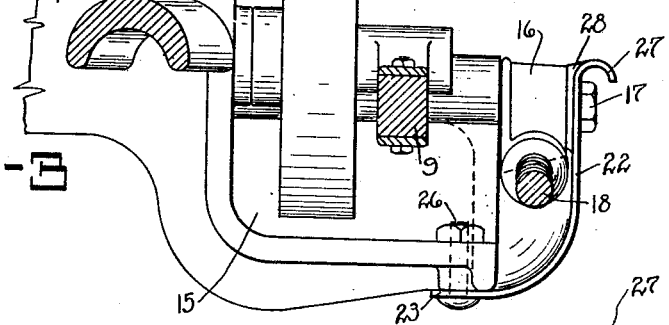
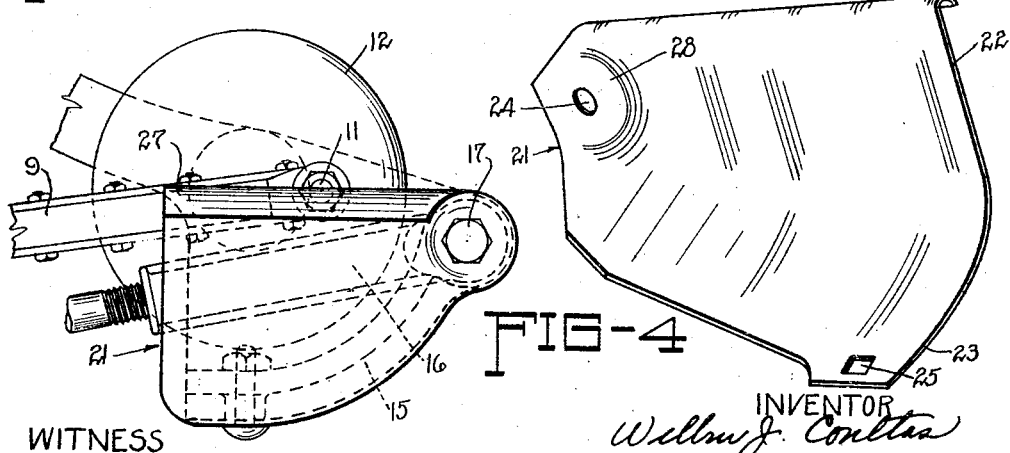
WITNESS
A. D. McLeay
INVENTOR
Wilbur J. Coultas
BY
E. C. Bopf ATTY.

Patented May 10, 1932

1,857,273

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

CRANK WHEEL SHIELD FOR MOWERS

Application filed March 31, 1930. Serial No. 440,343.

The present invention relates to a crank wheel shield for mowing machines.

In the conventional type of mower the reciprocation of the sickle or cutter blade, which does the mowing, is generally effected through a crank wheel and pitman disposed at the front of the mower, the pitman being connected at one end to the crank wheel and at the other end to the sickle and extending transversely of the machine. The crank wheel is mounted on the forward end of a drive shaft extending back to suitable gearing connecting to one of the mower wheels, from which the power necessary to reciprocate the sickle is derived.

In this conventional mower design, the crank wheel is generally situated at a relatively low point in the front of the machine, and it is customary to protect the same against striking hummocks or becoming fouled with grass, etc., by partially enclosing the same with a bowl-shaped member generally cast integral with the frame. The front of this protecting bowl is usually closed by a guard or shield which, desirably, is removable so that the crank wheel and its drive shaft can be removed from the machine by withdrawing the same lengthwise through the open front of the bowl.

My invention pertains to an improved construction of such guard or shield. Heretofore, this unit has been constructed integral with the drag bar socket and when the cutter bar is raised for transport or to dodge an obstruction the drag bar is also raised, presenting a gap or opening between the lower edge of the guard and the bowl. The object of the present invention is to produce a shield which is not effected by the rise or fall of the drag bar.

A further object of the invention is to produce a shield light and inexpensive of construction and capable of receiving shocks without breaking.

Other objects and advantages of my invention may be apparent to those skilled in the art after a consideration of the following detailed description, taken in conjunction with the accompanying drawings wherein like numerals refer to like parts and in which Figure 1 is a fragmentary plan view of a mower of conventional design, illustrating my shield on the front of the bowl which protects the crank wheel and pitman connection;

Figure 2 is a fragmentary front elevational view of that part of the mower embracing my invention;

Figure 3 is a sectional view taken on the plane of the line 3—3 of Fig. 1; and,

Figure 4 is a perspective view of the shield.

In the conventional type of mower chosen for illustration in Fig. 1, the main frame 5 is supported on two laterally separated wheels 6—6. The cutter bar, fragmentarily illustrated at 8, extends laterally from the main frame 5, at a point in front of one of the wheels 6. The sickle of this cutter bar is reciprocated through a pitman 9 which extends across the front of the machine and connects to a crank pin 11 projecting from the front face of the crank wheel 12. Such crank wheel is mounted on a shaft 13 which extends rearwardly through a journal portion 14 of the main frame and carries a bevel pinion adjacent its rear end which connects through speed increasing gearing with the adjacent wheel 6, all in accordance with standard practice in mower design.

The crank wheel 12 and pitman 9 are situated relatively close to the ground so that the pitman will have a substantially straight line reciprocation with the sickle, and because of this disposal, it is customary to protect the crank wheel and pitman against striking hummocks, or having grass, stubble, etc., become entangled therein, by extending a bowl-shaped protecting portion 15 forwardly and below the crank wheel. This bowl-shaped portion is usually cast integral with the journal portion 14 of the main frame, and is preferably arcuate in form, as viewed from the end thereof, (Figs. 2 and 3) so as to embrace the outer side and part of the under side of the crank wheel. To the end of permitting ready removal of the crank wheel 12 and its shaft 13, by "pulling" from the front end of journal portion 14, it is desirable to form the bowl portion 15 with an open front end and to close this end by a removable shield. A drag link socket 16 is pivotally supported on the bowl portion 15 of the mower frame by a cap screw 17. The socket 16 is adapted to receive the threaded end of the drag link 18 which extends transversely of the machine in front of the pitman 9 to a pivotal connection with the cutter bar. This drag link functions as a bracing support for the cutter bar 8 and also serves as an adjustable spacing member for adjusting registry between the ledger plate and cutter knives of the cutter bar 8. Such adjustment is obtained by threading the drag link and socket back and forth relatively to each other. It will be understood that as the cutter bar 8 is raised or lowered the drag link responds accordingly about its pivot 17.

By this invention I have provided a novel shield for enclosing the front side of the bowl portion 15 of the mower frame for preventing stones, grass, stubble, etc., from entering therein and becoming entangled with the moving parts including the drag link socket, and which is readily removable when such is desired. The shield 21 is constructed with a vertical portion 22 and extends downward and curves rearward into a horizontal portion 23 underlapping the forward edge of the bowl 15 of the mower frame. The outer surface of the curved portion serves, as a shoe, to deflect or ride over an obstruction which may be met in the operation of the machine. A hole 24 is provided in a recess 28 in the vertical portion of the shield and adjacent the outer edge thereof aligning with the cap screw 17 which secures the shield outside the drag link socket. Thus cap screw 17 not only functions as a pivotal support for drag link socket 17 but also as a means for supporting the shield. A square hole 25, to accommodate the head of a carriage bolt, is provided in the horizontal portion 23 adjacent the inner edge thereof and a bolt 26 is passed up thru said hole and an aligning hole in the bowl 15 of the mower frame.

The upper edge of the vertical portion 22 is rolled forwardly in a semicircular rib 27 to lend strength and rigidity to the shield. This curved portion also prevents dirt or other foreign matter, which contacts with the face of the shield, from riding over the top thereof. It functions as a trap to temporarily hold foreign matter until it works its way to one end and around the side of the bowl.

As described and illustrated I have provided a shield which entirely encloses the front side of the protecting bowl, irrespective of the position of the drag link, and which presents a smooth runner-like surface for mounting obstacles such as hummocks, grass, etc. Also the malleability of the shield permits of considerable shock without breaking which is a distinct improvement over the conventional form used.

What I consider as new and desire to secure by Letters Patent is:—

1. In a mower comprising a frame, a crank shaft journaled thereon, a crank wheel carried by said shaft, a bowl integral with said frame and enclosing said crank wheel at its lower and stubbleward sides, a shield comprising a single sheet metal stamping having a lower horizontal portion curving upwardly at its front edge to guide said bowl over foreign matter on the ground surface, and means for rigidly securing said shield to said bowl.

2. In a mower having a crank wheel protecting bowl and a drag link socket pivotally connected to said bowl by a bolt, a shield for mounting over the front end of the bowl comprising a sheet metal stamping having a vertical portion and a rearwardly curved horizontal portion underlapping said bowl, said vertical portion having a hole aligning with and receiving the drag link pivot bolt for mounting said vertical portion and said horizontal portion having a hole aligning with a hole in the lower portion of said bowl to accommodate a second bolt for securing said horizontal portion to said bowl.

3. In a mower having a crank wheel protecting bowl and a drag link socket pivotally connected to said bowl by a bolt, a shield for mounting over the front end of the bowl comprising a sheet metal stamping having a vertical portion and a rearwardly curved horizontal portion underlapping said bowl, said vertical portion having a hole aligning with and receiving the drag link pivot bolt for mounting said vertical portion, said horizontal portion having a hole aligning with a hole in the lower portion of said bowl to accommodate a second bolt for securing said horizontal portion to said bowl, and the upper edge of the vertical portion curved forwardly to form a semicircular rib.

4. In a mower having a crank wheel protecting bowl open at its front side and a drag link pivotally connected to the front edge of said bowl, a removable shield rigidly secured to said bowl, said shield comprising a vertical portion enclosing the front side of said bowl and embracing said drag link.

5. In a mower having a crank wheel protecting bowl open at its front side and a drag link pivotally connected to the front edge of said bowl, a removable shield rigidly secured to said bowl, said shield comprising a vertical portion enclosing the front side of said bowl and embracing said drag link and a downwardly and rearwardly curved portion embracing the lower edge of said bowl.

6. In a mower having a crank wheel protecting bowl open at its front side and a drag link pivotally connected to the front edge of said bowl by a bolt, a shield comprising a vertical portion enclosing the front side of said bowl and having a perforation aligning with and receiving said bolt, said bolt thereby serving to secure said shield to said bowl, and additional means for securing said shield to said bowl at another point.

7. A shield adapted to be removably mounted over the front end of the crank wheel protecting bowl of a mower, having a vertical portion enclosing the front face of said bowl and having a downwardly and rearwardly curved portion for embracing the lower front edge of the bowl to guide the bowl over foreign matter.

8. A shield adapted to be removably mounted over the front end of a crank wheel protecting bowl of a mower, comprising a sheet metal stamping having a vertical portion enclosing the front face of said bowl and having its top edge curved forwardly and downwardly to deflect foreign matter downwardly to thereby prevent such from riding over the top of the shield.

In witness whereof, I hereunto subscribe my name this 26th day of March, 1930.

WILBUR J. COULTAS.